(12) United States Patent
Sasaki et al.

(10) Patent No.: US 11,673,612 B2
(45) Date of Patent: Jun. 13, 2023

(54) HOOD POP-UP STRUCTURE

(71) Applicant: HONDA MOTOR CO., LTD., Tokyo (JP)

(72) Inventors: Kazutada Sasaki, Wako (JP); Chisato Suetsugu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 428 days.

(21) Appl. No.: 16/804,656

(22) Filed: Feb. 28, 2020

(65) Prior Publication Data

US 2020/0290682 A1    Sep. 17, 2020

(30) Foreign Application Priority Data

Mar. 11, 2019   (JP) .............................. JP2019-043907

(51) Int. Cl.
*B60R 21/38*        (2011.01)
*B62D 25/12*        (2006.01)
*E05D 3/12*         (2006.01)

(52) U.S. Cl.
CPC .............. *B62D 25/12* (2013.01); *B60R 21/38* (2013.01); *E05D 3/125* (2013.01); *E05Y 2900/536* (2013.01)

(58) Field of Classification Search
CPC ... B60R 21/38; B62D 25/12; E05Y 2900/536; E05D 2011/009
See application file for complete search history.

(56) References Cited

U.S. PATENT DOCUMENTS

| | | | | |
|---|---|---|---|---|
| 7,506,716 B1* | 3/2009 | Salmon | ................... | B60R 21/38 |
| | | | | 296/193.11 |
| 8,069,943 B2* | 12/2011 | Takahashi | ............... | B60R 21/38 |
| | | | | 180/274 |
| 9,085,282 B2* | 7/2015 | Agell Merino | ......... | B60R 21/38 |
| 9,283,924 B1* | 3/2016 | Farooq | .................... | B60R 21/38 |
| 9,475,452 B2* | 10/2016 | Lindmark | ............... | B60R 21/38 |
| 9,708,010 B2* | 7/2017 | Inoue | ..................... | B62D 25/12 |
| 9,751,493 B2* | 9/2017 | Narita | .................... | B62D 25/12 |
| 9,764,711 B2* | 9/2017 | Narita | ....................... | E05F 3/16 |
| 9,821,755 B2* | 11/2017 | Farooq | .................... | B60R 21/38 |

(Continued)

FOREIGN PATENT DOCUMENTS

| | | |
|---|---|---|
| DE | 102013021591 A1 | 7/2014 |
| JP | 2003182510 A  * | 7/2003 |

(Continued)

OTHER PUBLICATIONS

Chinese Office Action dated Jan. 7, 2022 with English translation, 14 pages.

(Continued)

*Primary Examiner* — Emma K Frick
(74) *Attorney, Agent, or Firm* — Rankin, Hill & Clark LLP (57) ABSTRACT

A hood back portion moving mechanism is supported with a hinge on a side of a vehicle body such that a back end portion of a hood provided at a front portion of a vehicle body is able to be opened and closed, and the hood is lifted up by an actuator. A back end portion of a pop-up link is rotatably coupled to an upper hinge included in the hinge, the hood is rotatably coupled to a front end portion of the pop-up link, and the actuator is bridged over the upper hinge and the hood.

9 Claims, 6 Drawing Sheets

(56) References Cited

U.S. PATENT DOCUMENTS

| | | | | |
|---|---|---|---|---|
| 9,994,192 B2* | 6/2018 | Narita | ............... | B62D 25/12 |
| 10,239,484 B2* | 3/2019 | Hwang | ............... | E05D 3/145 |
| 10,315,613 B2* | 6/2019 | Patterson | ............ | B62D 25/12 |
| 10,369,959 B2* | 8/2019 | McLundie | ............ | B60R 21/38 |
| 10,703,326 B2* | 7/2020 | Gabler | ............... | B60R 21/38 |

FOREIGN PATENT DOCUMENTS

| | | | | | |
|---|---|---|---|---|---|
| JP | 2015112967 A | * | 6/2015 | | |
| JP | 5799994 | | 9/2015 | | |
| JP | 2016-083957 A | | 5/2016 | | |
| JP | 2016-132311 A | | 7/2016 | | |
| JP | 2016-175433 A | | 10/2016 | | |
| JP | 2017056776 A | * | 3/2017 | | |
| JP | 6265185 B2 | * | 1/2018 | ............ | B60R 21/38 |
| JP | 6477376 B2 | * | 3/2019 | | |
| WO | WO-2015107793 A1 | * | 7/2015 | ............ | B60R 21/38 |

OTHER PUBLICATIONS

Japanese Office Action with English translation dated Apr. 12, 2022, 9 pages.

Chinese Office Action dated Sep. 7, 2022 issued in corresponding Chinese application No. 202010150258.5 English machine translation included (13 pages).

\* cited by examiner

HOOD POP-UP STRUCTURE

INCORPORATION BY REFERENCE

The present application claims priority under 35 U.S.C. § 119 to Japanese Patent Application No. 2019-043907 filed on Mar. 11, 2019. The content of the application is incorporated herein by reference in its entirety.

BACKGROUND OF THE INVENTION

Field of the Invention

The present invention relates to a hood pop-up structure.

Description of the Related Art

In the related art, a hood pop-up structure provided with a pop-up mechanism portion configured to lift up a back end portion of a hood provided at a front portion of a vehicle body is known (see Japanese Patent No. 5799994, for example).

The pop-up mechanism portion includes a hinge that supports the hood such that the hood can be opened and closed on the side of the vehicle body and an actuator that is bridged over the hinge (specifically, a part attached to the hinge on the side of the vehicle body) and the hood, and causes the back end portion of the hood to move upward by causing the actuator to operate.

Since Japanese Patent No. 5799994 employs a structure in which a lower portion of a wind shield with high rigidity, a wiper, and the like located behind the hood are exposed upward, the lower portion of the wind shield, the wiper, and the like are exposed upward without any change even if the pop-up mechanism portion causes the back end portion of the hood to move upward. Therefore, there is a concern that a person to be protected who has been bounced onto the hood collides against the lower portion of the wind shield, the wiper, and the like.

Also, since the front portion of the vehicle body is a noticeable portion of the vehicle, and a large number of vehicle components in addition to an engine are disposed below the hood, it is desirable to improve a degree of freedom in component layout and design at the front portion of the vehicle body.

An object of the invention is to provide a hood pop-up structure capable of further increasing a protection range for a person to be protected and increasing a degree of freedom in component layout and design at a front portion of a vehicle body.

SUMMARY OF THE INVENTION

There is provided a hood pop-up structure in which a back end portion of a hood provided at a front portion of a vehicle body is supported with a hinge on a side of the vehicle body such that the back end portion is able to be opened and closed, the hood is lifted up by an actuator, the hinge includes a movable-side hinge that extends forward from a rotation shaft supported on the side of the vehicle body and is able to rotate about the rotation shaft, a rotation link extending forward from a coupling shaft provided at the movable-side hinge is rotatably coupled to the coupling shaft, the hood is rotatably coupled to a front end portion of the rotation link, and the actuator is bridged over the movable-side hinge and the hood.

Also, there is provided a hood pop-up structure in which a back end portion of a hood provided at a front portion of a vehicle body is supported with a hinge on a side of the vehicle body such that the back end portion is able to be opened and closed, the hood is lifted up by an actuator, the hinge includes a link mechanism that is rotatably supported on the side of the vehicle body and a movable-side hinge that is rotatably coupled to the link mechanism and extends forward, a rotation link extending forward from a coupling shaft provided at the movable-side hinge is rotatably coupled to the coupling shaft, the hood is rotatably coupled to a front end portion of the rotation link, and the actuator is bridged over the movable-side hinge and the hood.

In the aforementioned configuration, the actuator may include a cylinder and a rod that projects from one end portion of the cylinder, and the rotation link and the cylinder may be disposed so as to intersect in a side view of the vehicle.

Also, in the aforementioned configuration, the movable-side hinge and the hood may be connected with a securing member that has a brittle portion.

Also, in the aforementioned configuration, the securing member may have one end secured to a vicinity of a coupling portion between the movable-side hinge and the rotation link and the other end secured to a vicinity of a coupling portion between the hood and the actuator.

Also, in the aforementioned configuration, the hood may include a securing link that is secured to a lower surface, and the front end portion of the rotation link and the actuator are rotatably coupled to the securing link.

According to the hood pop-up structure, since the hinge includes the movable-side hinge that extends forward from the rotation shaft supported on the side of the vehicle body and is able to rotate about the rotation shaft, the rotation link extending forward from the coupling shaft provided at the movable-side hinge is rotatably coupled to the coupling shaft, the hood is rotatably coupled to the front end portion of the rotation link, and the actuator is bridged over the movable-side hinge and the hood, it is possible to move the hood upward and obliquely backward, and it is possible to further increase a protection range of a person to be protected after moving the hood as compared with a hood that moves only upward as in the related art. Also, it is possible to eliminate operations of the hinge when the hood is popped up, it becomes unnecessary to secure a moving space for the hinge, and it is thus possible to increase a degree of freedom in component layout and design at the front portion of the vehicle body.

DETAILED DESCRIPTION OF THE PREFERRED EMBODIMENTS

Hereinafter, the respective embodiments of the invention will be described with reference to drawings. Also, description of directions such as front, back, left, right, up, and down in the explanation will be the same as directions with respect to a vehicle body of a vehicle 10 unless particularly indicated otherwise. The reference sign FR illustrated in the respective drawings indicates a front side of the vehicle body, the reference sign UP indicates an upper side of the vehicle body, and the reference sign LH indicates a left side of the vehicle body.

First Embodiment

Figure 1:
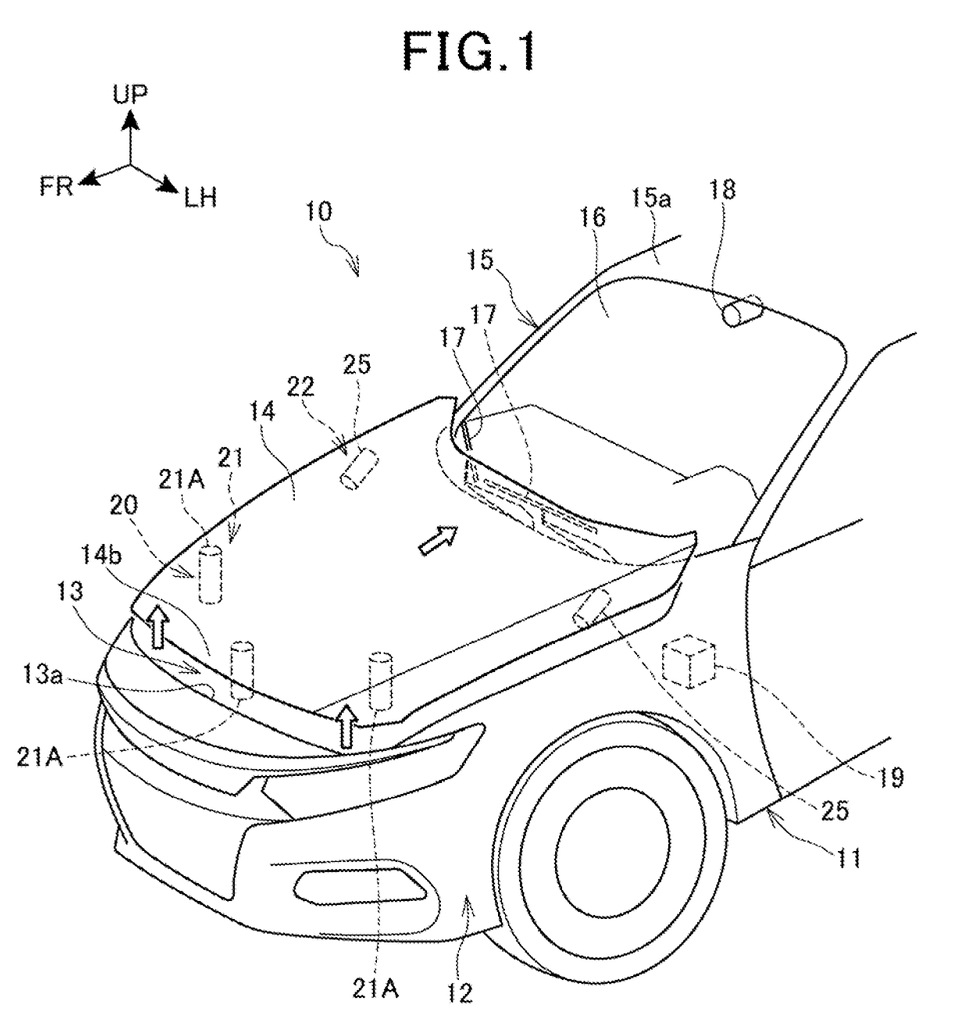
FIG. 1 is a perspective view illustrating a front portion of a vehicle body of a vehicle according to a first embodiment of the invention.
Figure 2:
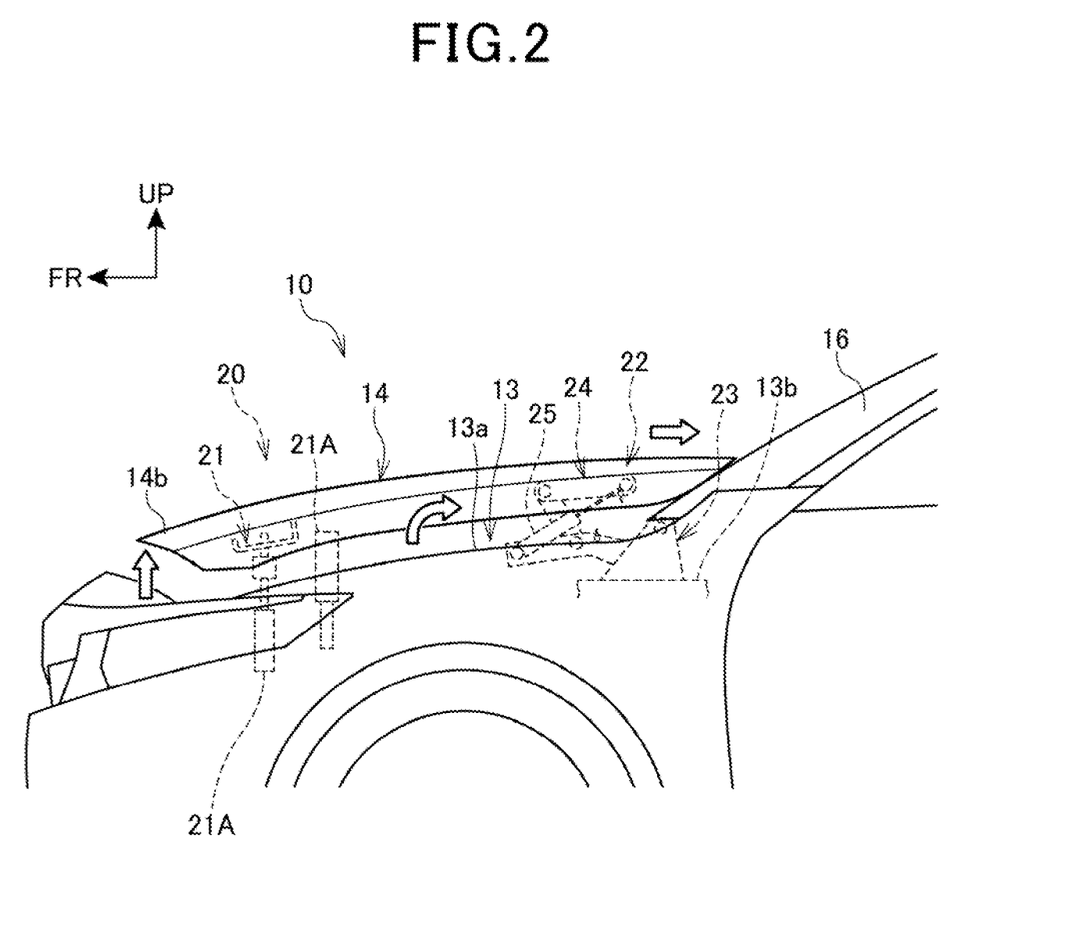
FIG. 2 is a left side view illustrating the front portion of the vehicle body.
Figure 3:
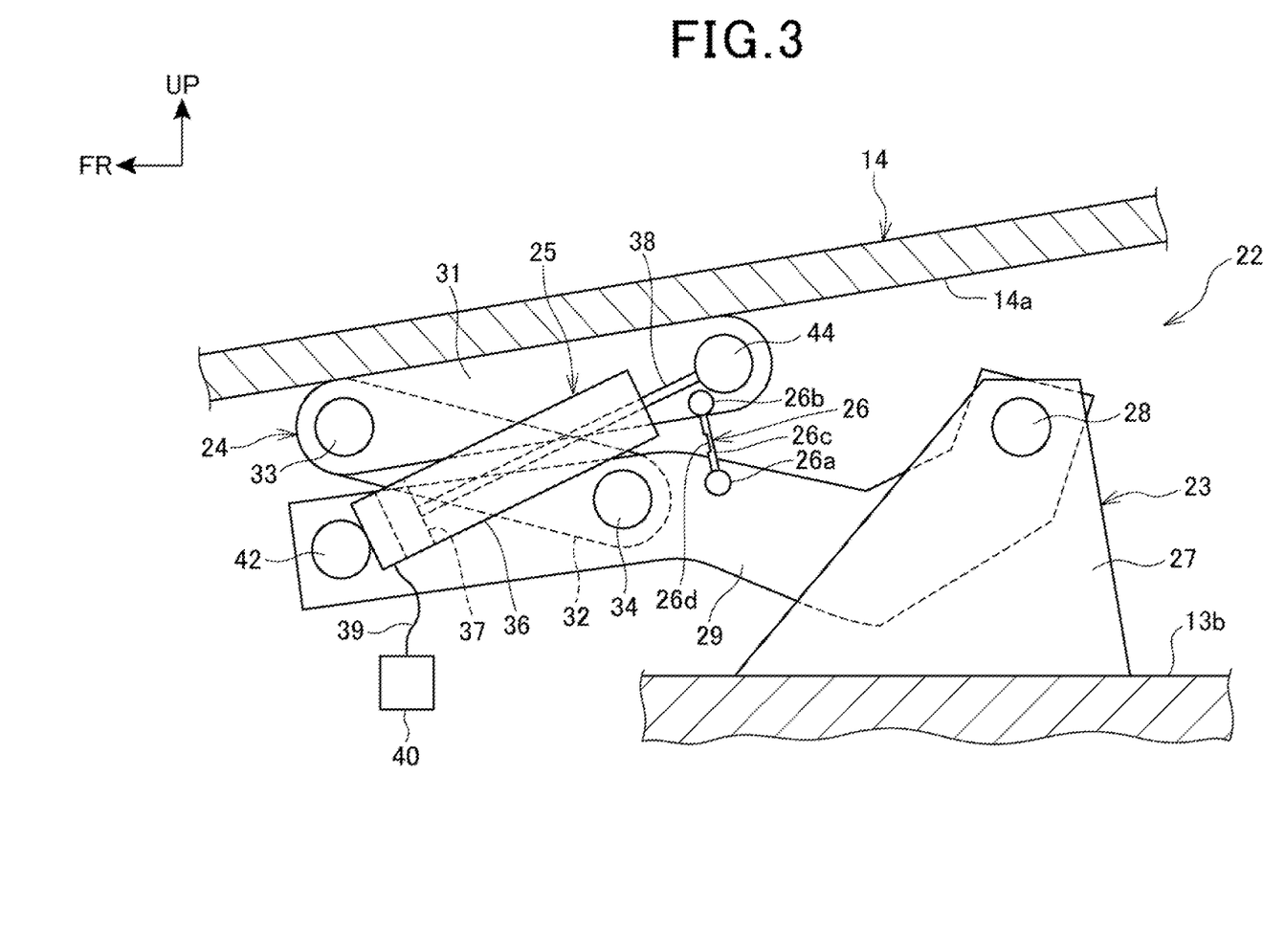
FIG. 3 is a left side view illustrating a hood back portion moving mechanism.

FIG. 1 is a perspective view illustrating a front portion of the vehicle body of the vehicle 10 according to a first embodiment of the invention, FIG. 2 is a left side view illustrating the front portion of the vehicle body, and FIG. 3 is a left side view (partial sectional view) illustrating a hood back portion moving mechanism 22.

As illustrated in FIGS. 1 and 2, the vehicle 10 is adapted such that an engine room 13 that accommodates an engine (not illustrated) is provided at a front body 12 that corresponds to the front portion of the vehicle body 11 and an upper opening 13*a* of the engine room 13 is covered with a hood 14 from the upper side.

The hood 14 is attached to a back edge portion of the upper opening 13*a* in the front body 12 via a pair of left and right hinges (not illustrated) such that the hood 14 can be opened and closed.

The vehicle 10 includes a hood moving mechanism 20 that causes the hood 14 to relatively move upward and obliquely backward with respect to the front body 12 when some object collides against the hood 14. The hood moving mechanism 20 absorbs impact that the colliding object receives by supporting the hood 14 such that the hood 14 can move with respect to the front body 12.

A front window 16 is provided at a front portion of a vehicle interior 15 that configures a part of the vehicle body 11, and a pair of left and right wipers 17 are disposed at a lower portion of the front window 16. Since the lower portion of the front window 16 is attached to a frame portion (not illustrated) that forms the vehicle interior 15, the lower portion of the front window 16 has high rigidity.

A pedestrian collision detection device 18 including a sensor (for example, an acceleration sensor) that detects an object that collides against the front portion of the vehicle body, a camera that images, through the front window 16, a state immediately before the collision of the object that collides against the front portion of the vehicle body, and the like is provided at an inner surface of a front portion of a roof 15*a* that configures the vehicle interior 15. Data of the pedestrian collision detection device 18 is input to a control unit 19 provided at a lower portion in the vehicle interior 15, and the control unit 19 controls the hood moving mechanism 20.

The hood moving mechanism 20 includes a hood front portion moving mechanism 21 that lifts up and moves a front portion of the hood 14 and a hood back portion moving mechanism 22 that lifts up and moves the back portion of the hood 14.

The hood front portion moving mechanism 21 includes a plurality of actuators 21A that are provided at the center, the left, and the right of the front end portion of the hood 14, and the plurality of actuators 21A serve as drive sources for lifting up the front portion of the hood 14.

As illustrated in FIGS. 2 and 3, the hood back portion moving mechanism 22 includes a pair of left and right hinges 23, a pair of left and right link mechanisms 24, a pair of left and right actuators 25, and a pair of left and right securing members 26.

The left and right hinges 23 are secured to the left and the right of a back edge portion 13*b* of the upper opening 13*a* of the engine room 13 and the hinges 23 are of a single pivot type configured of lower hinges 27 and upper hinges 29.

The lower hinges 27 are plate-shaped members with trapezoidal shapes in a side view that are attached to the back edge portion 13*b* of the upper opening 13*a*. The upper hinges 29 are plate-shaped members that are rotatably coupled to the lower hinges 27 via hinge shafts 28 and extend in the front-back direction.

The left and right link mechanisms 24 are provided between the left and right hinges 23 and the hood 14, respectively, and the link mechanisms 24 include hood mount links 31, pop-up links 32, and coupling pins 33.

The hood mount links 31 are attached to a lower surface 14*a* of the hood 14 so as to extend in the front-back direction. The hood mount links 31 may configure a part of the hood 14 or may be configurations that are separate from the hood 14.

The pop-up links 32 have front end portions rotatably coupled to front end portions of the hood mount links 31 via the coupling pins 33 and back end portions rotatably coupled to intermediate portions of the upper hinges 29 in the longitudinal direction (front-back direction) via coupling pins 34.

The left and right actuators 25 serve as drive sources for lifting up the hood 14, and the actuators 25 include cylinders 36, pistons 37, rods 38, pipes 39, and inflators 40.

Front end portions of the cylinders 36 are rotatably coupled to the front end portions of the upper hinges 29 via coupling pins 42. The pistons 37 are movably inserted into the cylinders 36. The rods 38 have one end portion secured to the pistons 37, intermediate portions in the longitudinal direction movably projecting from back end portions of the cylinders 36 in a sealed state from the cylinder 36, and the other end portions rotatably coupled to back end portions of the hood mount links 31 via coupling pins 44. The coupling pins 44 are disposed behind the coupling pins 33.

The inflators 40 are of a pyro type that generates gas using combustion of a gas generating agent and eject gas into the cylinders 36 through the pipes 39 when a command is provided from the control unit 19 (see FIG. 1). The pipes 39 have flexibility such that the pipes 39 are bent due to rotation of the cylinders 36. Also, the inflators 40 may not be members that are separate from the cylinders 36. For example, the inflators 40 may be of a built-in type in which gas generating devices are incorporated in the cylinders 36.

The cylinders 36 cross the pop-up links 32 in X shapes in a side view of the vehicle. By disposing the pop-up links 32 and the cylinders 36 in a crossing manner as described above, it is possible to reduce the size of the hood back portion moving mechanism 22 and realize the hood back portion moving mechanism 22 as a compact component.

The securing members 26 are members that integrally connect the upper hinges 29 to the hood mount links 31 and restrict rotation of the link mechanisms 24 in a normal situation and each integrally includes securing portions 26*a* and 26*b* provided at both end portions and a connecting portion 26*c* that connects the securing portions 26*a* and 26*b*. The securing portions 26*a* and 26*b* are portions that are secured to the upper hinges 29 and the hood mount links 31, respectively.

The securing portions 26*a* on the side of the upper hinges 29 are provided in the vicinities of the intermediate portions of the upper hinges 29 in the longitudinal direction and behind the coupling pins 34. Also, the securing portions 26a may be disposed in the vicinities in front of the coupling pins 34.

The securing portions 26b on the side of the hood mount links 31 are provided at back end portions of the hood mount links 31 and in the vicinities of the coupling pins 44.

The connecting portions 26c include brittle portions 26d that break when a tensile force exceeding a predetermined value acts. The brittle portions 26d are suitably small section portions with small sectional areas or notches that are formed at portions of the connecting portions 26c, for example.

Figure 4:
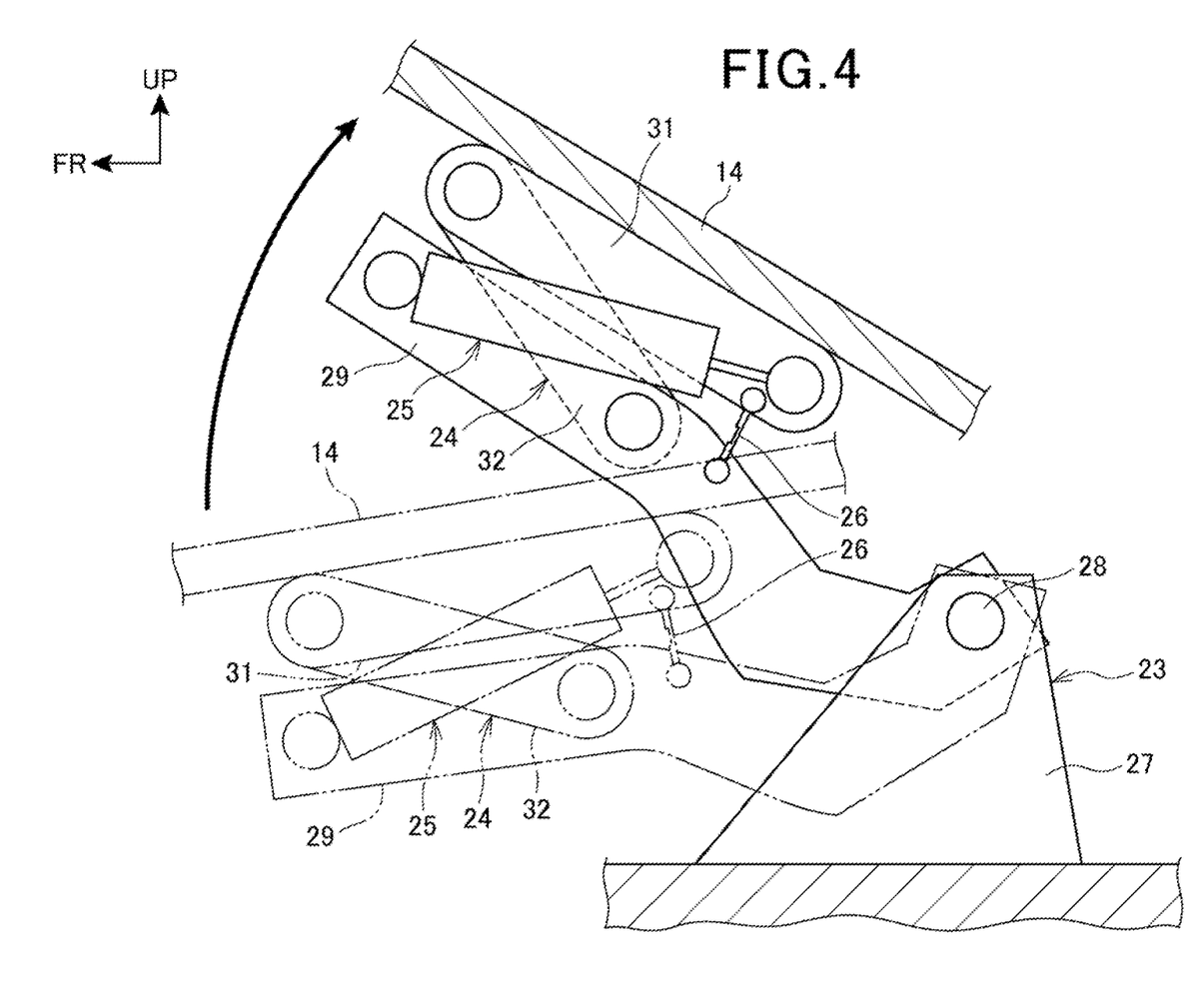
FIG. 4 is an action diagram illustrating opened and closed states of a hood.

FIG. 4 is an action diagram illustrating opened and closed states of the hood 14.

The solid line in the drawing illustrates the state in which the hood 14 is opened, and the two-dotted dashed line illustrates the state in which the hood 14 is closed (the state in FIG. 3).

When the state in which the hood 14 is closed is changed to the opened state in a normal situation, the upper hinges 29 rotate upward around the hinge shafts 28 with respect to the lower hinges 27.

Since the upper hinges 29 and the hood mount links 31 are integrally connected with the securing members 26, the pop-up links 32 do not rotate with respect to the upper hinges 29, and the hood mount links 31 do not rotate with respect to the pop-up links 32 at this time. The upper hinges 29, the link mechanisms 24, and the hood 14 integrally rotate as represented by the arrow.

Figure 5:
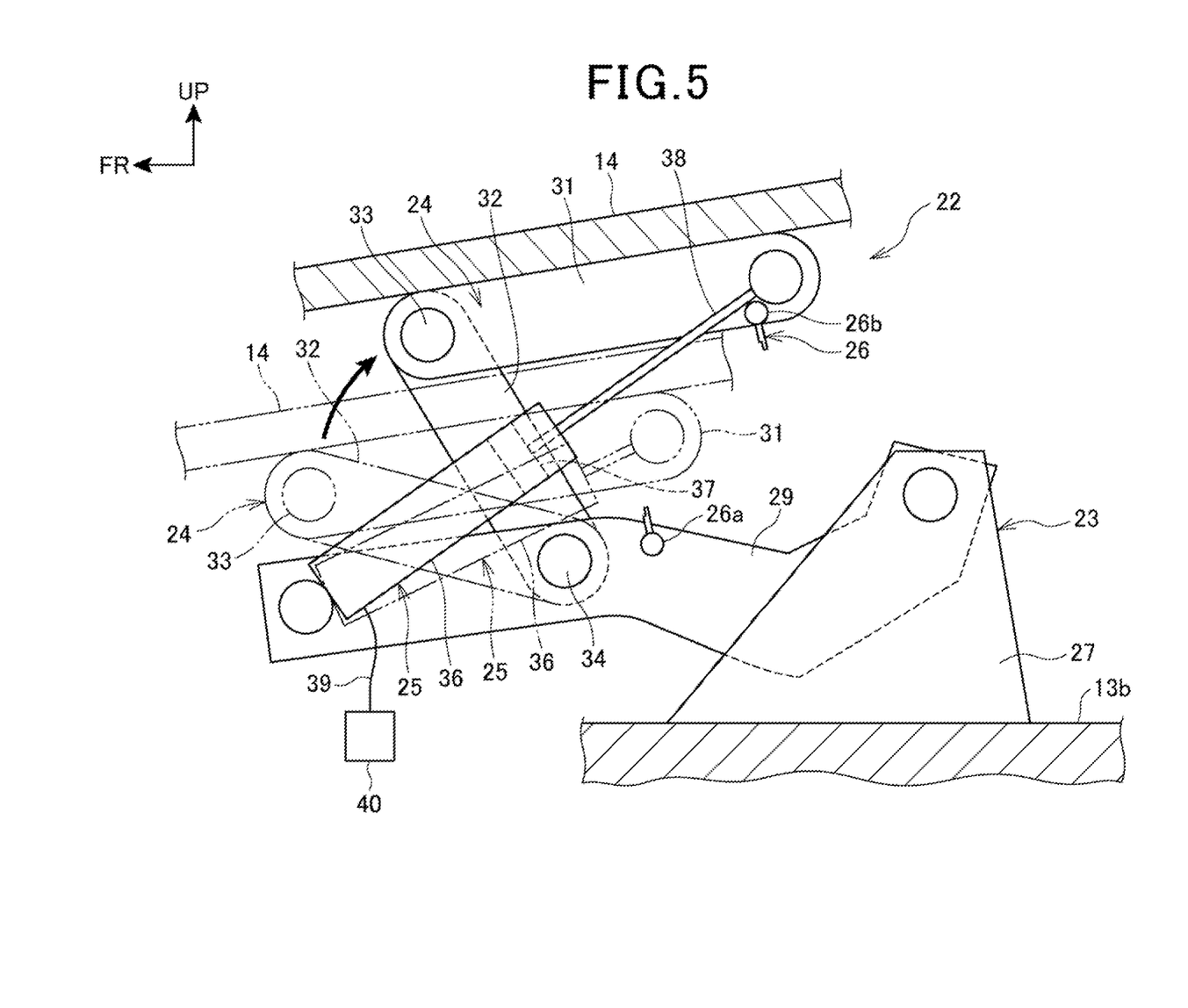
FIG. 5 is an action diagram illustrating actions of a hood moving mechanism.

FIG. 5 is an action diagram illustrating actions of the hood back portion moving mechanism 22.

The solid line in the drawing illustrates a state in which the actuators 25 operate, and the two-dotted dashed line illustrates a state before the actuators 25 operate (the state in FIG. 3).

In FIG. 1, the pedestrian collision detection device 18 prepares for detecting collision or a state before collision of a pedestrian against the front portion of the vehicle body during traveling of the vehicle.

In other words, in a case in which the pedestrian collision detection device 18 is a camera, the camera images the front side of the vehicle, and the control unit 19 predicts whether or not there is a pedestrian with a probability of collision against a front end portion 14b of the hood 14 on the basis of imaging data input from the camera. When the control unit 19 predicts that there is a pedestrian with a probability of collision against the front end portion 14b of the hood (at the time of collision prediction) in this state, then the control unit 19 transmits a firing signal to the inflators (not illustrated), for the hood front portion moving mechanism 21.

In a case in which the pedestrian collision detection device 18 is an acceleration sensor, and when the acceleration sensor inputs a signal at the time of collision to the control unit 19 in response to the collision of a pedestrian, and the control unit 19 made a collision determination (at the time of collision), the control unit 19 transmits a firing signal to the inflators, for the hood front portion moving mechanism 21.

When the firing signal is transmitted to the inflators, the inflators of the hood front portion moving mechanism 21 are fired, and gas is generated from the fired gas generating agent, as described above. The gas is ejected into the cylinders of the actuators 21A, the rods project by the pistons in the cylinders of the actuators 21a moving, and the front portion of the hood 14 to which the distal end portions of the rots are coupled is lifted up.

At the same time with the actions of the hood front portion moving mechanism 21, the hood back portion moving mechanism 22 acts in FIG. 5. Specifically, the control unit 19 transmits a firing signal to the inflators 40, for the hood back portion moving mechanism 22. In this manner, the inflators 40 are fired, and gas is generated from the fired gas generating agent. The gas is ejected into the cylinders 36 of the actuators 25 through the pipes 39, the pistons 37 start to move, and the rods 38 start to project.

Since the hood mount links 31 start to move upward with respect to the upper hinges 29 when the rods 38 start to project, a tensile force acting on the securing members 26 gradually increases. Then, when the tensile force on the securing members 26 exceeds a predetermined value, the brittle portions 26d of the connecting portions 26c of the securing members 26 brake, and the hood mount links 31 are separated from the upper hinges 29.

In this manner, the pop-up links 32 start to rotate upward (clockwise direction in FIG. 5) around the coupling pins 34 as illustrated by the arrow, a rotation angle from an initial state gradually increases, the front end portions of the pop-up links 32 (and the coupling pins 33) move upward and backward so as to depict arcs, and the back portion of the hood 14 is thus lifted upward and obliquely backward.

Eventually, the entire hood 14 is lifted upward and moves backward as represented by an outlined white arrow due to the aforementioned actions of the hood front portion moving mechanism 21 and the hood back portion moving mechanism 22 as illustrated in FIGS. 1 and 2.

In the embodiment, the upper hinges 29 and the hood mount links 31 are coupled with the pop-up links 32 in the hood back portion moving mechanism 22 as described above. In this manner, it is possible to cause the pop-up link 32 to rotate upward and backward when the actuators 25 are extended. In other words, it is possible to cause the hood 14 to move upward and obliquely backward.

By attaching the front end portions of the actuators 25 to the upper hinges 29, it is possible to press the upper hinges 29 against the side of the back edge portion 13b and keeps the hinges 23 in a stationary state due to a reaction force generated when the actuators 25 act when the hood 14 moves.

Second Embodiment

Figure 6:
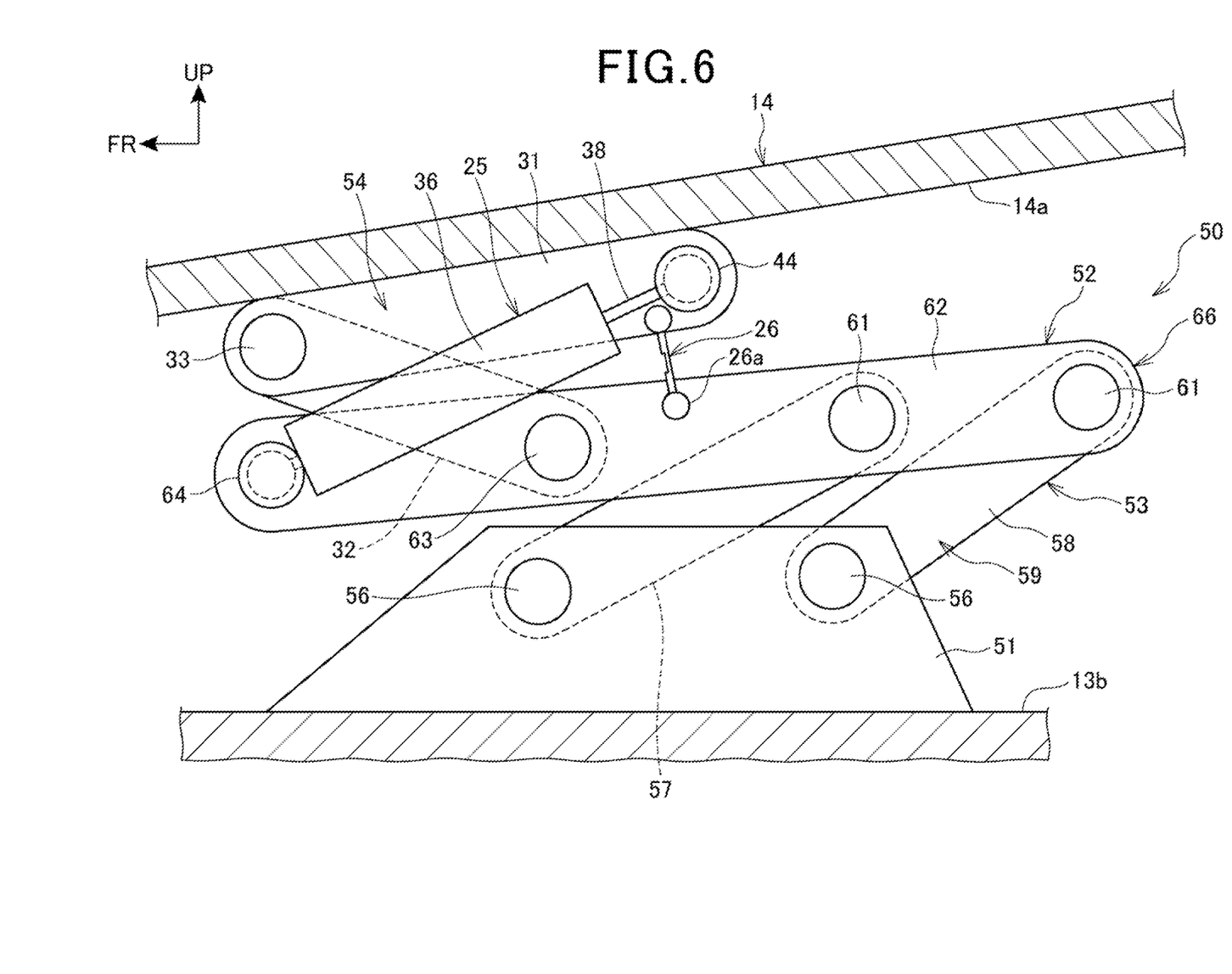
FIG. 6 is a side view illustrating a hood back portion moving mechanism according to a second embodiment.

FIG. 6 is a side view (partial sectional view) illustrating a hood back portion moving mechanism 50 according to a second embodiment.

The same reference signs will be applied to components that are the same as the components in the first embodiment, and detailed description will be omitted.

The hood back portion moving mechanism 50 includes a pair of left and right base hinges 51, a pair of left and right link mechanisms 52, a pair of left and right actuators 25, and a pair of left and right securing members 26.

The link mechanisms 52 include lower link mechanisms 53 coupled to the base hinges 51 and upper link mechanisms 54 coupled to front upper portions of the lower link mechanisms 53.

The left and right base hinges 51 are secured to the left and the right of the back edge portion 13b of the upper opening 13a (see FIG. 2) of the engine room 13 (see FIG. 2).

The lower link mechanisms 53 include front links 57 and back links 58, lower end portions of which are coupled to the front and the back of upper portions of the base hinges 51 with coupling pins 56, respectively, and upper hinges 62 coupled to upper end portions of the front links 57 and the back links 58, respectively, with coupling pins 61.

The front links 57 and the back links 58 are formed straight and are disposed such that back sides are located upward, and the front links 47 are disposed in front of the back links 58 and have longer entire lengths than the lengths of the back links 58.

The front links 57 and the back links 58 configure a base link mechanism 59.

The upper hinges 62 extend straight in the front-back direction and are disposed such that back sides are located upward, the back links 58 are coupled to back end portions of the upper hinges 62 via coupling pins 61, and upper end portions of the front links 57 are coupled to the upper hinges 62 on a side further forward than upper end portions of the back links 58.

The upper link mechanisms 54 are the same as the link mechanisms 24 according to the first embodiment and include the hood mount links 31, the pop-up links 32, and the coupling pins 33. The back end portions of the pop-up links 32 are coupled to the intermediate portions of the upper hinges 62 in the longitudinal direction (front-back direction) via the coupling pins 63.

The front end portions of the cylinders 36 of the actuators 25 are coupled to the front end portions of the upper hinges 62 via the coupling pins 64.

The securing portions 26a at the lower end portions of the securing members 26 are secured between the coupling pins 61 at the intermediate portions of the upper hinges 62 in the longitudinal direction and at the upper end portions of the front links 57 and the coupling pins 63 at the lower end portions of the pop-up links 32.

The aforementioned base hinges 51 and the lower link mechanisms 53 configure hinges 66 of a link type.

Such a hood back portion moving mechanism 50 can also cause the hood 14 to move upward and backward (that is, upward and obliquely backward) similarly to the hood moving mechanism 20 according to the first embodiment.

By attaching the front end portions of the actuators 25 to the upper hinges 62, it is possible to press the upper hinges 62 against the side of the back edge portion 13b and to keep the hinges 66 in a stationary state due to a reaction force generated when the actuators 25 act when the hood 14 moves.

As illustrated in FIG. 3 described above, the hood back portion moving mechanism 22 provided with the hood pop-up structure is adapted such that the back end portion of the hood 14 provided at the front portion of the vehicle body is supported with the hinges 23 on the side of the vehicle body such that the back end portion can be opened and closed and the hood 14 is lifted by the actuators 25.

The hinges 23 include upper hinges 29 that serve as movable-side hinges that extend forward from the hinge shafts 28 as rotation shafts supported on the side of the vehicle body and can rotate about the hinge shafts 28.

The pop-up links 32 as rotation links that extend forward from the coupling pins 34 as coupling shafts provided at the upper hinges 29 are rotatably coupled to the coupling pins 34, and the hood 14 is rotatably coupled to the front end portions of the pop-up links 32.

The actuators 25 are bridged over the upper hinges 29 and the hood 14.

Alternatively, the hood mount links 31 attached to the lower surface 14a of the hood 14 is rotatably coupled to the front end portions of the pop-up links 32.

The actuators 25 are bridged over the upper hinges 29 and the hood mount links 31.

Also, as illustrated in FIG. 6, the hood back portion moving mechanism 50 provided with the hood pop-up structure is adapted such that the back end portion of the hood 14 provided at the front portion of the vehicle body is supported with the hinges 66 on the side of the vehicle body such that the back end portion can be opened and closed and the hood 14 is lifted up by the actuators 25.

The hinges 66 include the base link mechanisms 59 that serve as link mechanisms rotatably supported on the side of the vehicle body and upper hinges 62 as movable-side hinges that are rotatably coupled to the base link mechanisms 59 and extend forward.

The pop-up links 32 that extends forward from the coupling pins 63 as coupling shafts provided at the upper hinges 62 are rotatably coupled to the coupling pins 63, and the hood 14 is rotatably coupled to the front end portions of the pop-up links 32.

The actuators 25 are bridged over the upper hinges 62 and the hood 14.

Alternatively, the hood mount links 31 attached to the lower surface 14a of the hood 14 are rotatably coupled to the front end portions of the pop-up links 32.

The actuators 25 are bridged over the upper hinges 62 and the hood mount links 31.

According to the configurations of the hood back portion moving mechanisms 22 and 50 illustrated in FIGS. 3 and 6, it is possible to move the hood 14 upward and obliquely backward. In this manner, it is possible to increase a protection range of a person to be protected after moving the hood 14 up to the lower portion of the front window 16 and the upper side of the wipers 17 as compared with a hood that moves only upward as in the related art.

Also, it is possible to eliminate operations of the hinges 23 when the hood 14 is popped up, it becomes unnecessary to secure a moving space for the hinges 23, and it is thus possible to increase a degree of freedom in component layout and design at the front portion of the vehicle body.

Further, since the link mechanisms 24 can be added to the hinges 23 and 66 for both the hinges 23 of the single pivot type as illustrated in FIG. 3 and the hinges 66 of the link type as illustrated in FIG. 6, it is possible to improve versatility.

As illustrated in FIGS. 3 and 6, the actuators 25 include the cylinders 36 and the rods 38 projecting from the one end portions of the cylinders 36, and the pop-up links 32 and the cylinders 36 are disposed so as to cross in a side view of the vehicle.

With this configuration, it is possible to reduce the sizes of the hood pop-up structures, that is, the hood back portion moving mechanisms 22 and 50 and realize the hood back portion moving mechanisms 22 and 50 as compact components.

Also, the upper hinges 29 and 62 and the hood 14 (specifically, the hood mount links 31 included in the hood 14) are connected with the securing members 26 that have the brittle portions 26d.

With this configuration, it is possible to satisfactorily open and close the hood 14 in a normal situation, and it is possible to cause the securing members 26 to break from the brittle portions 26d and to cause the pop-up links 32 to rotate when the actuators 25 act at the time of collision prediction or at the time of collision, by including the securing members 26. Also, it is possible to simplify the securing members and to reduce costs.

In addition, each securing member 26 has one end secured to the vicinity of the coupling pin 34 or 63 that serve as a coupling portion between the upper hinge 29 or 62 and the pop-up link 32 and the other end secured to the vicinity of the coupling pin 44 that serves as a coupling portion between the hood 14 (specifically, the hood mount link 31 included in the hood 14) and the actuators 25.

With this configuration, it is possible to secure the securing members 26 to a portion that is far from the coupling pins 33 that serve as coupling portions between the pop-up links 32 and the hood mount links 31 and to further reduce a load acting on the securing members 26 when the hood 14 is opened and closed. In this manner, it is possible to lower the strength of the securing members 26. In this manner, it is possible to reduce the size and the weight of the securing members 26.

Also, the hood 14 includes the hood mount links 31 that serve as securing links secured to the lower surface 14a, and the front end portions of the pop-up links 32 and the actuators 25 are rotatably coupled to the hood mount links 31.

With such a configuration, it is not necessary to form the hood 14 with a complicated form in order to couple the pop-up links 32 to the actuators 25 and to reduce costs.

The aforementioned embodiments illustrate just an aspect of the invention and can arbitrarily be modified and applied without departing from the gist of the invention.

For example, although the pop-up links 32 and the actuators 25 are coupled to the hood mount links 31 as illustrated in FIGS. 3 and 6 in the aforementioned embodiments, the invention is not limited thereto. The pop-up links 32 and the actuators 25 may be coupled directly to the hood 14 without using the hood mount links 31.

Although the actuators 25 have a structure including the cylinders 36, the pistons 37, the rods 38, and the inflators 40, the invention is not limited thereto, and the actuators 25 may use air bags that are expanded by gas ejected from the inflators.

In this case, the coupling pins 44 that couples the hood 14 to the actuators 25 are provided on the side further backward than the coupling pins 33 that couples the hood 14 to the pop-up links 32.

Also, the brittle portions may not be provided, in particular as the securing members 26, and members that have predetermined strength may be employed as the securing members. Further, the upper hinges 29 and 62 and the hood mount links 31 may be detachably connected with mechanical engagement mechanisms or electric/magnetic mechanisms using solenoids, permanent magnets, or the like instead of the securing members 26.

Although the end portions of the cylinders 36 on the side of the coupling pins 42 are coupled to the front end portions of the upper hinges 29 and the distal end portions of the rods 38 are coupled to the back end portions of the hood mount links 31 as illustrated in FIG. 3, the invention is not limited thereto. The end portions of the cylinders 36 on the side of the coupling pins 42 may be coupled to the back end portions of the hood mount links 31, and the distal end portions of the rods 38 may be coupled to the front end portions of the upper hinges 29.

REFERENCE SIGNS LIST

11 Vehicle body
14 Hood
14a Lower surface
23, 66 Hinge
25 Actuator
26 Securing member
26d Brittle portion
28 Hinge shaft (rotation shaft)
29, 62 Upper hinge (movable-side hinge)
31 Hood mount link (securing link)
32 Pop-up link (rotation link)
34 Coupling pin (coupling shaft, coupling portion between movable-side hinge and rotation link)
36 Cylinder
38 Rod
44 Coupling pin (coupling portion between hood and actuator)
59 Base link mechanism
63 Coupling pin (coupling shaft)

What is claimed is:

1. A hood pop-up structure in which a back end portion of a hood provided at a front portion of a vehicle body is supported with a hinge on a side of the vehicle body such that the back end portion is able to be opened and closed and the hood is lifted up by an actuator,
    the hood pop-up structure comprising:
    a hood front portion moving mechanism that lifts up and moves a front portion of the hood;
    a hood back portion moving mechanism, including the hinge, that lifts up and moves a back portion of the hood backward; and
    a hood mount link that is provided to the hood and extends in the front-back direction of the vehicle body,
    wherein the hinge of the hood back portion moving mechanism includes a movable-side hinge that extends forward from a rotation shaft supported on the side of the vehicle body and is able to rotate about the rotation shaft,
    a rotation link extending forward from a coupling shaft provided at the movable-side hinge is rotatably coupled to the coupling shaft, and the hood mount link is rotatably coupled to a front end portion of the rotation link via a coupling pin, the hood mount link and the movable-side hinge are provided to be spaced from each other along lengths thereof and are coupled with the rotation link, and
    the actuator includes a cylinder and a rod that projects from one end portion of the cylinder, the cylinder is coupled to the movable-side hinge and the rod is coupled to the hood mount link, and the rotation link and the cylinder are disposed so as to intersect in a side view of the vehicle.

2. The hood pop-up structure according to claim 1, wherein the movable-side hinge and the hood are connected with a securing member that has a brittle portion.

3. The hood pop-up structure according to claim 2, wherein the securing member has one end secured to a vicinity of a coupling portion between the movable-side hinge and the rotation link and the other end secured to a vicinity of a coupling portion between the hood mount link and the rod of the actuator.

4. The hood pop-up structure according to claim 1, wherein the hood mount link is secured to a lower surface of the hood, and the front end portion of the rotation link and the rod of the actuator are rotatably coupled to the hood mount link.

5. The hood pop-up structure according to claim 1, wherein a front end portion of the cylinder is rotatably coupled to the movable-side hinge.

6. The hood pop-up structure according to claim 1, wherein the rotation link is rotatably coupled at a back end to the coupling shaft.

7. A hood pop-up structure in which a back end portion of a hood provided at a front portion of a vehicle body is supported with a hinge on a side of the vehicle body such that the back end portion is able to be opened and closed and the hood is lifted up by an actuator, the hood pop-up structure comprising:
- a hood front portion moving mechanism that lifts up and moves a front portion of the hood;
- a hood back portion moving mechanism, including the hinge, that lifts up and moves a back portion of the hood backward; and
- a hood mount link that is provided to the hood and extends in the front-back direction of the vehicle body, wherein the hinge of the hood back portion moving mechanism includes a link mechanism that includes a rotation link and that is rotatably supported on the side of the vehicle body and a movable-side hinge that is rotatably coupled to the link mechanism and extends forward, the rotation link extending forward from a coupling shaft provided at the movable-side hinge is rotatably coupled to the coupling shaft, and the hood mount link is rotatably coupled to a front end portion of the rotation link via a coupling pin, the hood mount link and the movable-side hinge are provided to be spaced from each other along lengths thereof and are coupled with the rotation link, and the actuator includes a cylinder and a rod that projects from one end portion of the cylinder, the cylinder is coupled to the movable-side hinge and the rod is coupled to the hood mount link, and the rotation link and the cylinder are disposed so as to intersect in a side view of the vehicle.

8. The hood pop-up structure according to claim 7, wherein a front end portion of the cylinder is rotatably coupled to the movable-side hinge.

9. The hood pop-up structure according to claim 7, wherein the rotation link is rotatably coupled at a back end to the coupling shaft.

* * * * *